United States Patent Office 3,218,292
Patented Nov. 16, 1965

3,218,292
STABILIZATION OF POLYETHYLENE WITH CALCIUM SILICATE AND AN AMINE OR PHENOL
Shaffer E. Horne, Texas City, Tex., assignor to Monsanto Company, a corporation of Delaware
No Drawing. Filed Dec. 29, 1961, Ser. No. 163,029
5 Claims. (Cl. 260—45.9)

This invention relates to improved polyethylene compositions. More particularly it relates to polyethylene compositions which are stabilized against molecular degradation under conditions of elevated temperature and mechanical working. In another respect, this invention relates to polyethylene which can be fabricated in a process such as film or sheet extrusion without molecular degradation.

Polyethylenes have numerous valuable properties which permit them to be used in the manufacture of pipe, film, wire coating, or various molded objects such as bottles and the like. It has been observed that these polymers, under conditions of elevated temperature or mechanical working as would be developed in extruders and injection molding machines, undergo molecular degradation resulting in a deterioration of physical properties. Adequate stabilization of such polymers is of utmost importance in order to protect the polymer during the fabrication and use. Generally, the molecular breakdown which occurs in these polymers under conditions of elevated temperature or mechanical working during fabrication is evidenced by a substantial increase in the melt index of the polymer.

A better test, however, of degradation caused by conditions of temperature or mechanical working is the determination of gloss and haze of the polyethylene film produced from the polymer. Decreased gloss and increased haze are the results of degradation and the values obtained for these properties can be used as the best direct measure of the stability of the polyethylene polymer.

This problem of stablization is aggravated in the film manufacturing field because certain substances must be added to the polymer prior to the manufacture of film to eliminate blocking. Blocking can be defined simply as the tendency for film surfaces to adhere to each other or to resist separation, either due to molecular adhesion or vacuum between film layers. This is worsened by smooth film surfaces as indicated by low haze readings. Low haze is characteristic of high clarity film while high haze is characteristic of poor clarity film due to surface roughness. This roughness tends to scatter light which causes poor clarity. In practice, film layers are normally separated by a combination of sliding and lifting forces. The lifting component is resisted by blocking forces and the sliding component is resisted by frictional forces. Blocking can be measured as the perpendicular force required to separate one film layer from another.

The blocking of polyethylene films is a more serious problem today because of the wide usage of high clarity films which are characterized by having low surface haze of 15 percent or less. Heretofore, surface haze values have been above 15 percent, or in most cases about 30 percent, before technological advancement in film manufacture was accomplished. But as film haze values were lowered to the range of 3 to 15, the problem of blocking became much more serious. This has been overcome to a large extent by the addition of certain components such as finely divided siliceous matter, principally diatomaceous earth (sold under the trade name of "Superfloss" by Johns Manville Co.) and other synergistic compositions which almost all contain certain proportions of diatomaceous earth.

Because of the large amounts of anti-block agents required in polyolefin film compositions, stabilization has been made much more difficult since such agents impart a slight degrading effect to the polymer. Therefore, together with the molecular breakdown and degradation which polyethylene undergoes because of the temperature and mechanical working conditions during the fabrication and because of the large amounts of diatomaceous earth required to anti-block polyethylene films, large quantities of stabilizing agents have been required and this demand is increasing. It is apparent then that the search for new stabilizing compositions has been a continuous research problem for all polyethylene manufacturers.

It has now been discovered that polyethylene can be stabilized against thermal degradation and can also be improved in anti-block characteristics without adverse effects on the clarity of the polyethylene film by incorporating into the polymer a dialkyl sulfide, a hindered phenol or a secondary aromatic amine and finely divided calcium silicate.

It is, therefore, the object of this invention to provide a polyethylene composition which is stabilized against thermal degradation and has good anti-block characteristics. Another object of this invention is to provide a stabilized polyethylene which can be processed under conditions of elevated temperatures and mechanical working without substantial degradation. An additional object is to provide a polyethylene composition which when formed into film shows outstanding resistance to blocking without adverse effect on the clarity of the film. These and other objects and advantages of the invention will be apparent to those skilled in the art from the following description.

According to this invention a polyethylene composition is stabilized against thermal degradation resulting from elevated temperatures or mechanical working and shows improved resistance to blocking when formed into film by incorporating therein a dialkyl sulfide, a hindered phenol or a secondary aromatic amine and a finely divided calcium silicate.

The following examples are presented as being typical and should not be construed to unduly limit the invention.

*Example I*

A quantity of high pressure refined polyethylene amounting to about 360 pounds, having a melt index of 3.0 and a density of 0.920, is extruded into sample batches at temperatures of 340° F. and 500° F. The film manufactured therefrom has a gloss of 52.0 and 58.0 at the respective extrusion temperatures. The film haze is 9.0 percent and 5.0 percent, respectively. The blocking value of the film extruded at 340° F. is 4.0 grams per linear centimeter, that is, the grams of force required to separate two sheets of film one centimeter wide.

*Example II*

A 360 pound sample of high pressure refined polyethylene having a melt index of 3.0 and a density of 0.920 had incorporated therein by means of a Banbury type mixer 75 parts per million of a compound known to the trade as Ionol which is the chemical compound, 2-6-di-tertiary-butyl-4-methyl phenol and 0.15 weight percent of a diatomaceous earth sold under the trade name of "Superfloss."

This polymer was extruded in two samples, one at 340° F. and one at 500° F. The film manufactured from this polymer had a gloss of 56.1 and 66.2, respectively, and a haze of 8.5 percent and 4.0 percent, respectively. The blocking value after extrusion at 340° F. was measured at 0.99 gram per centimeter.

*Example III*

A quantity of high pressure refined polyethylene amounting to 360 pounds had incorporated therein 25 parts per million of Ionol, 25 parts per million of butylated hydroxyanisol and 0.15 weight percent Superfloss. The polymer had a melt index of 3.0 and a density of 0.920. Two samples of the polyethylene material were extruded at temperatures of 340° F. and 500° F. The film manufactured therefrom had a gloss of 54.7 and 66.0, respectively. The film haze was 7.6 percent and 4.1 percent, respectively. The blocking value after extrusion at 340° F. was measured as 1.01 grams per centimeter.

*Example IV*

A 360 pound batch of high pressure refined polyethylene had incorporated therein 0.15 weight percent of finely divided hydrated calcium silicate. The melt index of the polyethylene was 3.0 and the density was 0.920. The stability of the polyethylene was compared with that of equivalent polyethylene having no calcium silicate therein by determining the time required to reach a melt index of 10 during an oven aging test at 100° C. The time required for the polyethylene containing no additive was 94 hours and the time required for the polyethylene containing the 0.15 weight percent calcium silicate was 110 hours. The blocking value of polyethylene containing no additive is approximately 4.0 grams whereas the value for the polyethylene containing calcium silicate is appropriately 1.0 gram. The results of the oven aging tests indicate a slight improvement in the polyethylene stability as a result of the calcium silicate being present.

*Example V*

A 360 pound quantity of high pressure refined polyethylene having a melt index of 3.0 and a density of 0.920 had incorporated therein 25 parts per million of Ionol and 0.15 weight percent of the finely divided hydrated calcium silicate. Two samples of the composition above were extruded at a temperature of 340° F. and 500° F. The gloss of the extruded film was measured as 55.4 and 71.8, respectively. The film haze was determined to be 8.1 percent and 3.3 percent, respectively. The blocking value after extrusion at 340° F. was measured at 0.94 gram per centimeter.

It is apparent from the above examples that the novel polyethylene composition containing Ionol and calcium silicate is a composition which is stabilized against molecular degradation under conditions of elevated temperature and mechanical working and exhibits good anti-block characteristics. These data also demonstrate the surprising improvement in stabilization of the above combination of Ionol and calcium silicate by the marked superiority over known antioxidants in combination with a diatomaceous earth anti-block agent. It is surprising indeed that the stabilizing amount of Ionol may be reduced to about one-third in combination with calcium silicate and still derive the same or superior stabilizing effect as well as maintain equal or better anti-blocking characteristics. This unquestionably shows a synergistic effect as well as a substantial improvement over the other combinations.

The synergistic combination of an antioxidant for polyethylene and calcium silicate may be incorporated into the polymers by any suitable means such as by milling the polymer on a roll mill or in a Banbury type mixer. Incorporation can also be effected by solution blending or the like. The antioxidants and the calcium silicate may be incorporated separately or together into the polyethylene composition.

The amount of calcium silicate which may be used to derive the synergistic effect in combination with an antioxidant for polyethylene is in the range from about 0.01 weight percent to about 1 weight percent of the polymer present. The preferred amount, however, is in the range from about 0.05 weight percent to about 0.5 weight percent.

The most effective antioxidants for polyethylene are the dialkyl sulfides, the hindered phenols and the secondary aromatic amines. The hindered phenols provide good color, while the amines are poor in this respect. Consequently, the hindered phenols are used whenever color considerations are involved, even though the amines are generally regarded as more effective in other respects such as high temperature stabilization and oxidation resistance. The higher dialkyl sulfides show moderate stabilizing activity in polyethylene but low molecular weight sulfides are poor. The antioxidant concentration in the polyethylene composition can vary from as little as 5 parts to 5,000 parts per million parts of polyethylene. Generally, the concentration of antioxidant preferred is from 10 parts per million to 1,000 parts per million.

Examples of hindered phenols having an antioxidant effect on polyethylene other than those exemplified in the examples are 2,6-tert-butyl-4-methoxyphenol; bis(2-methyl-4-hydroxy-5-tert-butyl-phenyl) sulfide; 2,2-bis(4-hydroxyphenyl) propane; bis(2-hydroxy-3-tert-butyl-5-methylphenyl) methane; bis(2-hydroxy-3-tert-butyl-5-ethylphenyl) methane; 4,4-thiobis(6-tert-butyl-m-cresol); and 4,4-butylidene bis(6-tert-butyl-m-cresol).

Also within the category of effective hindered phenol type antioxidants are the drying oil-soluble resinous condensation products of formaldehyde and alkyl or phenyl substituted monohydric phenol as for example oil-soluble condensation products of para-tert-amylphenol and formaldehyde; of para-phenyl phenol and formaldehyde; and of mixtures of such phenols and formaldehyde.

Examples of secondary aromatic amines having an antioxidant effect on polyethylene include N,N'-diphenyl-p-phenylenediamine and N,N'-dinaphthyl-p-phenylenediamine and in general, compounds of the formula:

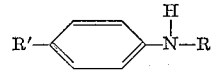

where R is phenyl or napthyl and R' is hydrogen, hydroxy, naphthylamino, phenylamino or alkyl ($C_4$ to $C_8$) inclusive.

There are very few dialkyl sulfides which are desirable as polyethylene stabilizers. The best and most widely used example is dilauryl thiodipropionate.

The unpredictability of determining whether or not a given combination of two or more antioxidant compounds will synergize to produce a stabilizing effect in polyethylene and other incidental effects such as anti-blocking which is greater than the additive effect of the individual antioxidants is well known. There is no known method whereby a combination of compounds can be predicted to be synergistic, short of actually testing the combination. This is true even though the different components comprising the combination may be well known and their individual effect on the various properties of the polyethylene compositions.

Thus, polyethylenes stabilized in accordance with the invention have an extended life expectance and can be used more effectively than unstabilized polyethylenes for a wide diversity of uses, including outdoor uses requiring prolonged exposure to the elements. Polyethylenes stabilized in accordance with the invention can be cast, extruded, rolled or molded into sheets, rods, tubes, piping, filaments and other shaped articles, including the widely used films of the polymer from about 0.2 to 100 mils in thickness. The present compositions can be used for coating paper, wire, metal foil, glass fiber fabrics, synthetic and natural textiles and other such materials. Likewise, small amounts of other additives such as other polymers, resins or plastics, as well as other stabilizers or inhibitors, that are commonly added to polyethylene for specific uses are not deleterious to the effectiveness of the present synertistic combination.

What is claimed is:

1. A composition comprising a normally solid polymer of ethylene, from 5 parts per million to 5,000 parts per million of an antioxidant for polyethylene selected from the group consisting of dialkyl sulfides, hindered phenols and secondary aromatic amines and from 0.01 weight percent to about 1 weight percent of the polymer of a finely divided calcium silicate.

2. A composition comprising a normally solid polymer of ethylene, from 5 parts per million to 5,000 parts per million of an antioxidant for polyethylene selected from the group consisting of 2-6-di-tertiary-butyl-4-methyl phenol, butylated hydroxyanisol; dilauryl thiodipropionate; 4,4'-butylidene bis(6-tert-butyl-m-cresol); 4,4'-thiobis(6-tert-butyl-m-cresol) and secondary aromatic amines characterized by the formula:

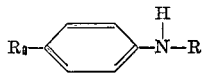

where R is selected from the group consisting of phenyl and naphthyl groups and R' is selected from the group consisting of hydrogen, hydroxyl, naphthylamino, phenylamino groups and alkyl radicals having from 4 to 8 carbon atoms, and from 0.01 weight percent of about 1 weight percent of the polymer of a finely divided calcium silicate.

3. A polyethylene composition comprising a normally solid polymer of ethylene, from 5 parts per million to 5,000 parts per million of 2-6-di-tertiary-butyl-4-methyl phenol and from 0.01 weight percent to about 1 weight percent of the polymer of a finely divided calcium silicate.

4. A polyethylene composition comprising a normally solid polymer of ethylene, from 10 parts per million to 1,000 parts per million of 2-6-di-tertiary-butyl-4-methyl phenol as an antioxidant and from 0.05 weight percent to about 0.5 weight percent of a finely divided calcium silicate.

5. A stabilized polyethylene film having improved clarity, surface characteristics, and anti-block properties, said film containing from 10 parts per million to 1,000 per million by weight of 2-6-di-tertiary-butyl-4-methyl phenol as an antioxidant for polyethylene and from 0.05 weight percent to 0.5 weight percent of the polymer present of a finely divided calcium silicate.

References Cited by the Examiner

UNITED STATES PATENTS 2,985,617   5/1961   Salyer et al. _____ 260—45.9

LEON J. BERCOVITZ, *Primary Examiner.*

ALPHONSO D. SULLIVAN, *Examiner.*